Patented May 24, 1932

1,860,043

UNITED STATES PATENT OFFICE

MATTHIAS LUDWIGSEN, OF STOCKHOLM, SWEDEN

PRINTER'S INK AND IN THE PROCESS OF MANUFACTURING SAME

No Drawing. Application filed September 24, 1928, Serial No. 308,125. Renewed October 7, 1931.

This invention relates to new and useful improvements in printer's ink and in colors relevant to the former, incidentally identifying the process of manufacturing those with the results obtained.

Thus this new process has for its object to provide a printer's ink, which has the advantage of being cheaper to manufacture than any of those so far known and also considerably better, one of the reasons therefor being that the said printer's ink, as here devised, is presenting an agent of a considerable short substance or consistency, which is especially adaptable in producing a sharp, clear impression, a feature found very valuable when cuts and other printing devices are used.

A part of my discovery resides primarily in the use of waste-sulphite-liquor as a connecting medium for the ingredients, which may be varied as to the colors and proportions, comprising the said printer's ink.

The said waste-sulphite-liquor will fully replace those resins or gums used especially in the more expensive inks or compositions at the same time permitting the manufacture thereof at a normal temperature, that is without resorting to any boiling or heating process, a feature which unquestionably may be said to be of very great importance, as this incidentally reduces the cost of manufacturing.

The waste-sulphite-liquor may be concentrated to the desired strength by heating and evaporation, whereupon water, alkalis and phosphoric acid are added. The acid and alkali, which may be an alkaline sodium, potassium, calcium or other similar compound combine to the effect of forming salts which have the advantage of binding the water so that the latter does not separate or penetrate those rolls that are water absorbent, i. e. those made of stearin, glycerine and glue. Separation of water or deposition of a hard coating on the rolls or matrices, when they become hot due to the high speed of revolution is also completely avoided.

If the waste-sulphite-liquor has not been properly treated and thoroughly mixed with the oils and water added to it to make a stable composition, it will again separate from the said combination and form a hard deposit on the rolls when the latter become heated.

The so-called newspaper ink, or color medium may be composed of especially suitable oils combined with water and having added to it coloring ingredients, but a still better result may be obtained when waste-sulphite-liquor is further added thereto. In this connection it may be appropriate to state, that if the waste-sulphite-liquor is treated with an alkali and phosphoric acid, a full, deep, black color may be obtained with less ink or coloring matter, inasmuch as the waste-sulphite-liquor, thus treated, will oxidize in the air as soon as the ink has been printed on the paper and will closely adhere to the latter forming a quickly drying layer thereupon which will not come off.

It would be difficult to give an exact formula for the mixture as the waste-sulphite-liquor may vary greatly in composition, especially with regard to its contents of $Na_2CO_3$ (sodium carbonate) and $CaO$ (lime) while other salts contained therein also may be of importance in this regard.

However without resorting to an analysis of the waste-sulphite-liquor, a formula as the following would in most cases be applicable to produce a printer's ink:

| | Per cent |
|---|---|
| Waste-sulphite-liquor | 40 to 60 |
| Water | 10 to 20 |
| Alkalis | 2 to 4 |
| Phosphoric acid | 4 to 6 |
| Coloring materials | 6 to 7 |
| Oils | 38 to 45 |

To provide a newspaper ink or coloring medium from oils, water and coloring materials solely, the mixture must contain the following quantities:

| | Per cent |
|---|---|
| Oil | 60 to 80 |
| Alkalis | 2 to 6 |
| Water | 28 to 10 |
| Coloring matter | 10 to 20 |

In order to make a more stable composition, or emulsion, 2 to 5% of benzene, chlorbenzene or other benzene derivatives may be added. The gloss or lustre of the color may be increased by adding to it a solution of sodium or potassium bichromate; the said solution may be applied in amounts up to 10% of the mixture.

The phosphoric acid called for by the formula will combine with the alkali, or more specifically, the NaOH will combine with the $PO_4H_3$ to form $Na_2HPO_4$ in the color mixture. As a coloring medium may be used carbon black, nigrosine, aniline black or similar related ink coloring materials or dyes.

However, it will be to the advantage, with respect to the printer's-ink, or color-medium containing waste-sulphite-liquor, to use hydroxide of iron, precipitated from $FeSO_4$ by means of alkali in the usual manner.

It is obvious that changes may be made in the arrangement and combination of the different matters and ingredients, as defined within the scope of the appended claims, and I do not therefore limit myself to the statements and definitions set forth and described herein.

What I claim as new and desire to secure by Letters Patent of the United States, is:

1. A printing ink, having a vehicle formed by combining waste sulphite liquor, alkali, and phosphoric acid together.

2. A printing ink having a vehicle consisting of an emulsion formed by combining waste sulphite liquor, alkali, phosphoric acid, and an oil in the presence of water together.

3. A printing ink having a vehicle consisting of an emulsion formed by combining waste sulphite liquor, alkali, phosphoric acid, and an oil in the presence of water together, and a coloring material.

4. A printing ink having a vehicle consisting of an emulsion formed by combining 40 to 60% waste sulphite liquor, 2 to 4% alkali, 4 to 6% phosphoric acid, and 38 to 45% of an oil in the presence of 10 to 20% of water together.

5. A printing ink having a vehicle consisting of an emulsion formed by combining 40 to 60% waste sulphite liquor, 2 to 4% alkali, 4 to 6% phosphoric acid, and 38 to 45% of an oil in the presence of 10 to 20% of water together, and about 6 to 7% of a coloring material.

Signed at New York city, in the county of New York and State of New York, this 21st day of September, A. D. 1928.

MATTHIAS LUDWIGSEN.